US009260191B2

(12) United States Patent
Pollard et al.

(10) Patent No.: US 9,260,191 B2
(45) Date of Patent: Feb. 16, 2016

(54) HEAT EXHANGER APPARATUS INCLUDING HEAT TRANSFER SURFACES

(75) Inventors: Berwyn Owain Pollard, Wolverhampton (GB); David Russell Scott, Walsall (GB)

(73) Assignee: HS MARSTON AEROSPACE LTD. (GB)

( * ) Notice: Subject to any disclaimer, the term of this patent is extended or adjusted under 35 U.S.C. 154(b) by 980 days.

(21) Appl. No.: 13/219,252

(22) Filed: Aug. 26, 2011

(65) Prior Publication Data
US 2013/0048243 A1  Feb. 28, 2013

(51) Int. Cl.
B60H 1/00 (2006.01)
B64D 13/00 (2006.01)
F28D 1/02 (2006.01)
F28F 3/08 (2006.01)

(52) U.S. Cl.
CPC .............. B64D 13/00 (2013.01); F28D 1/0246 (2013.01); F28F 3/086 (2013.01)

(58) Field of Classification Search
CPC .............. B60H 1/18; F01M 5/00; F01N 5/02
USPC ...................................... 165/41, 51
See application file for complete search history.

(56) References Cited

U.S. PATENT DOCUMENTS

| | | | | |
|---|---|---|---|---|
| 2,088,734 A * | 8/1937 | Duran ................ | B60H 1/00457 | |
| | | | | 165/41 |
| 2,168,166 A | 8/1939 | Larrecq | | |
| 2,348,748 A * | 5/1944 | Nichols ................ | F01D 5/082 | |
| | | | | 165/51 |
| 2,354,698 A * | 8/1944 | Norris ................ | F01D 5/082 | |
| | | | | 165/51 |
| 2,400,392 A * | 5/1946 | Davenport ............... | F02C 7/14 | |
| | | | | 165/51 |
| 2,435,990 A * | 2/1948 | Weiler .......................... | 415/116 | |
| 2,439,775 A * | 4/1948 | Kennedy .................. | F01P 3/18 | |
| | | | | 165/41 |
| 2,524,066 A | 10/1950 | Andersen | | |
| 2,925,714 A * | 2/1960 | Cook ...................... | F02C 3/103 | |
| | | | | 165/51 |
| 3,013,641 A * | 12/1961 | Compton ................. | B64C 3/00 | |
| | | | | 165/41 |
| 3,024,606 A * | 3/1962 | Adams .................... | F02K 1/822 | |
| | | | | 165/51 |
| 3,039,265 A * | 6/1962 | Williams et al. ................ | 165/51 | |

(Continued)

FOREIGN PATENT DOCUMENTS

DE  1167557 A  10/1969
EP  0469825 A2  7/1991

(Continued)

OTHER PUBLICATIONS

Combined Examination and Search Report No. GB1109642.7 dated Sep. 28, 2011.

(Continued)

Primary Examiner — Ljiljana Ciric
(74) Attorney, Agent, or Firm — Cantor Colburn LLP

(57) ABSTRACT

A heat exchanger apparatus is disposed within a first pathway along which a first fluid flows. The heat exchanger apparatus includes a component disposed in the first pathway and the component includes heat transfer surfaces. Each heat transfer surface includes a central body, an outer body surrounding the central body and intermediate bodies extending between the central body and the outer body. The heat transfer surfaces are arranged together such that the central bodies, the outer bodies and the intermediate bodies of each heat transfer surface form at least one or more second pathways along which a second fluid flows and such that the outer bodies of each heat transfer surface form a component surface disposed to contact the first and second fluids.

15 Claims, 6 Drawing Sheets

(56) References Cited

U.S. PATENT DOCUMENTS

| | | | | |
|---|---|---|---|---|
| 3,053,283 A * | 9/1962 | Milford | ...................... | F02K 1/82 165/51 |
| 3,148,511 A | 9/1964 | Gable | | |
| 3,424,234 A * | 1/1969 | Laing | .............................. | 165/51 |
| 3,442,324 A * | 5/1969 | Clay, Jr. | ................. | F22B 1/1815 165/51 |
| 3,584,972 A * | 6/1971 | Bratkovich | ............ | B21D 53/78 29/889.721 |
| 3,848,307 A * | 11/1974 | Kydd | ...................... | B23P 15/04 228/204 |
| 3,925,979 A * | 12/1975 | Ziegler | .................... | F02C 7/047 244/134 R |
| 3,933,327 A * | 1/1976 | Cook | ...................... | B64D 15/04 244/134 B |
| 4,185,369 A * | 1/1980 | Darrow | .................. | B23P 15/04 165/185 |
| 4,203,566 A * | 5/1980 | Lord | ...................... | B64D 13/00 165/41 |
| 4,302,940 A * | 12/1981 | Meginnis | ................ | F23R 3/002 416/231 A |
| 4,314,007 A * | 2/1982 | Gessinger | ............. | B22D 19/00 29/889.71 |
| 4,356,678 A | 11/1982 | Andrews et al. | | |
| 4,429,737 A | 2/1984 | McManus et al. | | |
| 4,434,842 A | 3/1984 | Gregory | | |
| 4,447,466 A * | 5/1984 | Jackson | ............... | B22D 23/003 164/46 |
| 4,471,609 A | 9/1984 | Porter | .................... | B64D 27/18 244/117 A |
| 4,543,781 A * | 10/1985 | Rice | ........................ | F01K 23/10 60/730 |
| 4,545,197 A * | 10/1985 | Rice | ........................ | F01D 5/185 60/39.58 |
| 4,561,246 A * | 12/1985 | Hovan | ............................ | 165/51 |
| 4,565,490 A * | 1/1986 | Rice | ........................ | F01K 23/10 415/114 |
| 4,574,451 A * | 3/1986 | Smashey | ................ | B23P 15/04 416/241 R |
| 4,589,176 A * | 5/1986 | Rosman | .................... | B22F 5/04 416/229 A |
| 4,602,681 A | 7/1986 | Daikoku et al. | | |
| 4,638,628 A * | 1/1987 | Rice | ........................ | F01D 5/185 60/755 |
| 4,738,416 A * | 4/1988 | Birbragher | ............. | B64D 15/04 244/134 B |
| 4,747,448 A | 5/1988 | Beduz et al. | | |
| 4,759,401 A * | 7/1988 | Pfouts et al. | ...................... | 165/51 |
| 4,830,315 A | 5/1989 | Presz et al. | | |
| 4,835,958 A * | 6/1989 | Rice | ........................ | F01D 5/185 415/114 |
| 4,923,146 A * | 5/1990 | Anthony | .................. | B64C 1/38 244/117 A |
| 4,977,952 A * | 12/1990 | Schatz | ............... | B60H 1/00492 165/41 |
| 5,004,044 A | 4/1991 | Horgan et al. | | |
| 5,059,095 A * | 10/1991 | Kushner | .................... | C23C 4/02 29/889.21 |
| 5,182,158 A * | 1/1993 | Schaeffer | ................ | B32B 3/12 428/116 |
| 5,328,331 A * | 7/1994 | Bunker | .................... | F01D 5/187 415/115 |
| 5,423,498 A * | 6/1995 | Fluegel | .................... | B64C 1/38 165/41 |
| 5,545,003 A * | 8/1996 | O'Connor | ................ | B22C 9/04 415/115 |
| 5,626,462 A * | 5/1997 | Jackson | ................. | C22C 32/00 416/229 A |
| 5,640,767 A * | 6/1997 | Jackson | ................. | B23P 15/04 118/427 |
| 5,709,263 A | 1/1998 | Mira | | |
| 5,729,969 A | 3/1998 | Porte | | |
| 5,876,659 A * | 3/1999 | Yasutomi | ................ | F01D 5/282 164/461 |
| 6,027,078 A * | 2/2000 | Crouch | .................... | B64C 21/00 244/130 |
| 6,042,951 A * | 3/2000 | Kojima | .................... | C23C 4/02 416/241 B |
| 6,119,457 A * | 9/2000 | Kawamura | ............ | F01K 23/065 165/51 |
| 6,167,952 B1 | 1/2001 | Downing | | |
| 6,168,871 B1 * | 1/2001 | Ritter | .................... | B22F 3/1208 416/95 |
| 6,233,824 B1 | 5/2001 | Dobbs et al. | | |
| 6,311,676 B1 * | 11/2001 | Oberg | ................. | F02B 29/0462 165/51 |
| 6,321,830 B1 * | 11/2001 | Steinmann | ............. | B60K 11/04 165/41 |
| 6,520,252 B1 | 2/2003 | Bizzarro | | |
| 6,582,194 B1 * | 6/2003 | Birkner | .................... | B23P 15/04 415/115 |
| 6,684,943 B2 | 2/2004 | Dobb et al. | | |
| 6,709,230 B2 * | 3/2004 | Morrison | ................. | F01D 5/189 415/115 |
| 6,834,515 B2 | 12/2004 | Sunder et al. | | |
| 6,871,697 B2 * | 3/2005 | Albright | ............... | E02F 9/0883 165/41 |
| 6,913,064 B2 * | 7/2005 | Beals | ........................ | B22C 9/10 164/131 |
| 6,939,599 B2 * | 9/2005 | Clark | ........................ | B32B 3/30 428/178 |
| 7,032,654 B2 | 4/2006 | Wand et al. | | |
| 7,152,670 B2 | 12/2006 | Dobbs et al. | | |
| 7,195,055 B1 * | 3/2007 | Jaeger | ............................. | 165/51 |
| 7,247,002 B2 * | 7/2007 | Albrecht | ................ | F01D 5/147 415/200 |
| 7,278,472 B2 * | 10/2007 | Meshenky | ........... | F02B 29/0462 165/51 |
| 7,435,058 B2 * | 10/2008 | Campbell | ................ | F01D 5/14 416/232 |
| 7,625,180 B1 * | 12/2009 | Liang | ........................ | F01D 5/186 29/889.2 |
| 7,631,485 B2 | 12/2009 | Suciu et al. | | |
| 7,744,348 B2 * | 6/2010 | Bezencon | ............... | B23P 15/02 416/241 R |
| 7,765,788 B2 | 8/2010 | Schwarz | | |
| 7,810,311 B2 | 10/2010 | Schwarz et al. | | |
| 7,810,312 B2 | 10/2010 | Stretton et al. | | |
| 7,815,417 B2 * | 10/2010 | Somanath | ............... | F01D 5/147 415/116 |
| 7,854,586 B2 | 12/2010 | Major et al. | | |
| 7,871,578 B2 | 1/2011 | Schmidt | | |
| 7,878,233 B2 * | 2/2011 | Bates | .................. | F02B 29/0456 123/563 |
| 7,886,520 B2 | 2/2011 | Stretton et al. | | |
| 7,992,628 B2 * | 8/2011 | Melby | ................. | F02B 29/0462 165/41 |
| 8,015,789 B2 * | 9/2011 | Brand et al. | ..................... | 165/41 |
| 8,127,828 B2 * | 3/2012 | Schwarz et al. | ..................... | 165/41 |
| 8,215,181 B1 | 7/2012 | Helmink | ............... | G01M 5/0016 73/760 |
| 8,387,245 B2 * | 3/2013 | Bunker | .................... | B23P 15/04 416/223 R |
| 8,499,566 B2 * | 8/2013 | Lacy | ...................... | F23R 3/002 60/752 |
| 8,506,256 B1 * | 8/2013 | Brostmeyer | ............ | F01D 5/147 29/889.721 |
| 8,533,949 B2 * | 9/2013 | Bunker | .................... | F01D 5/147 29/889.7 |
| 8,690,098 B2 * | 4/2014 | Todorovic | ........................ | 165/41 |
| 8,739,404 B2 * | 6/2014 | Bunker | .................... | F01D 5/147 29/889.2 |
| 8,938,879 B2 * | 1/2015 | Bunker | .................... | F01D 5/147 29/889.7 |
| 2002/0179296 A1 | 12/2002 | Jassens | | |
| 2007/0215326 A1 | 9/2007 | Schwarz et al. | | |
| 2008/0264616 A1 | 10/2008 | Deschodt et al. | | |
| 2008/0279688 A1 * | 11/2008 | Jensen et al. | ..................... | 416/95 |
| 2009/0087355 A1 | 4/2009 | Ashe | | |
| 2009/0101319 A1 | 4/2009 | Ashe | | |
| 2009/0120629 A1 | 5/2009 | Ashe | | |
| 2009/0139700 A1 | 6/2009 | Bignon | | |
| 2009/0252615 A1 * | 10/2009 | Gross | .................... | F01D 5/187 416/97 R |
| 2010/0062238 A1 * | 3/2010 | Doyle et al. | ............... | 416/223 R |

(56) References Cited

U.S. PATENT DOCUMENTS

| | | |
|---|---|---|
| 2010/0128752 A1 | 5/2010 | Van Suetendael et al. |
| 2010/0139900 A1 | 6/2010 | Thompson |
| 2010/0155016 A1* | 6/2010 | Wood et al. .................. 165/51 |
| 2010/0206532 A1 | 8/2010 | Alahyari et al. |
| 2010/0209229 A1 | 8/2010 | Propheter-Hinckley et al. |
| 2010/0251692 A1* | 10/2010 | Kinde, Sr. ............. F02K 5/026 60/226.1 |
| 2011/0005707 A1 | 1/2011 | Seto |
| 2011/0042524 A1* | 2/2011 | Hemmelgarn ........... B64C 3/48 244/203 |
| 2011/0056198 A1* | 3/2011 | Flakus et al. ................. 60/598 |
| 2011/0084174 A1* | 4/2011 | Hemmelgarn ........... B64C 3/48 244/200 |
| 2011/0174301 A1 | 7/2011 | Haydock et al. |
| 2012/0198814 A1* | 8/2012 | Hirshberg .................... 60/204 |
| 2012/0207591 A1* | 8/2012 | Lee ....................... F01D 5/187 165/51 |

FOREIGN PATENT DOCUMENTS

| | | |
|---|---|---|
| EP | 1429101 A2 | 6/2004 |
| EP | 1212571 B1 | 11/2005 |
| EP | 1944475 A2 | 1/2008 |
| FR | 2951701 A1 | 4/2011 |
| GB | 1058201 A | 2/1967 |
| WO | 01/16533 A1 | 3/2001 |

OTHER PUBLICATIONS

GB Search and Examination Report; GB1215173.4; 9 pgs.

* cited by examiner

HEAT EXHANGER APPARATUS INCLUDING HEAT TRANSFER SURFACES

BACKGROUND OF THE INVENTION

The subject matter disclosed herein relates to heat exchangers and, more particularly, to heat exchangers including a plurality of laminates.

To date, heat exchangers for various applications, such as aerospace applications, have traditionally been constructed by either plate/fin technology or tube/shell technology. Both technologies have their advantages and disadvantages. In the latter case, a first fluid is supplied to an interior of a given body, which is formed of thermally conductive materials, and a second fluid is supplied to an exterior of the given body such that heat transfer occurs between the first and second fluids across the thermally conductive materials. In the former case, separating plates formed of thermally conductive materials are provided between the first and second fluids.

BRIEF DESCRIPTION OF THE INVENTION

According to one aspect of the invention, a heat exchanger apparatus is provided and is configured to be disposed within a first pathway along which a first fluid flows. The heat exchanger apparatus includes a component disposed in the first pathway and including heat transfer surfaces configured to define at least one or more second pathways along which a second fluid flows. The heat transfer surfaces are configured to form an exterior surface of the component and are disposed to contact the first and/or second fluids.

According to another aspect of the invention, an assembly having a heat exchanger apparatus is provided. The assembly includes outer and inner walls configured to define a first pathway along which a first fluid flows and a component disposed in the first pathway and including laminates coupled together to form heat transfer surfaces configured to define at least one or more second pathways along which a second fluid flows. The heat transfer surfaces include a primary heat transfer surface disposed to contact the first and/or second fluids, and a normal direction to a plane of the primary heat transfer surface is transverse with respect to a normal direction to respective planes of the outer and inner walls.

According to yet another aspect of the invention, an assembly having a heat exchanger apparatus is provided. The assembly includes outer and inner walls configured to define a first pathway along which a first fluid flows and a component disposed to extend across the first pathway, the component including a plurality of laminates coupled together to form heat transfer surfaces configured to define at least one or more second pathways along which a second fluid flows, the heat transfer surfaces including a primary heat transfer surface disposed to contact the first and/or second fluids whereby heat is transferred between the first and second fluids via the primary heat transfer surface, and the primary heat transfer surface being oriented such that a normal direction to a plane of the primary heat transfer surface is oriented transversely with respect to a normal direction to respective planes of the outer and inner walls.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, laminated technology and emerging additive technologies, such as Direct Metal Laser Sintering (DMLS), have enabled changes to conventional heat exchanger design. In particular, shaped laminates can be created leading to replacement of aerodynamic components having limited thermal performance with aerodynamic components including heat exchange capability.

Figure 1:
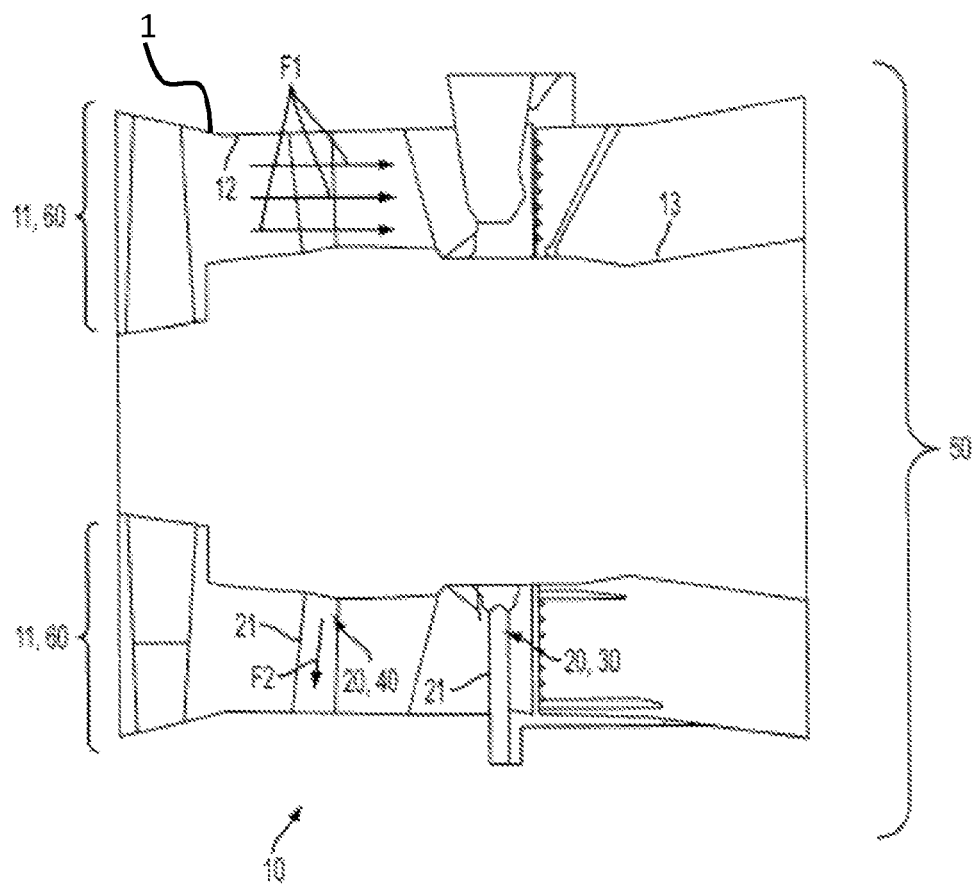
FIG. 1 is a side view of a turbomachine in accordance with embodiments of the invention.

With reference to FIG. 1, a heat exchanger apparatus 10 is provided and is configured to be disposed in an assembly 1 within a first pathway 11, which is defined by outer and inner peripheral walls 12 and 13, and along which a first flow F1 is directed. The heat exchanger apparatus 10 includes one or more components 20 disposed in the first pathway 11 and includes one or more primary and secondary heat transfer surfaces 21. The heat transfer surfaces 21 are configured to define at least one or more second pathways 22 (FIG. 2) along which a second flow F2 is directed. The heat transfer surfaces 21 and, more particularly, the primary ones of the heat transfer surfaces 21 are configured to form an exterior surface of the one or more components 20 and are disposed to come into contact with the first flow F1 and/or the second flow F2. In this way, heat may be transferred among the first and second flows F1 and F2 by way of the heat transfer surfaces 21.

In accordance with embodiments, the second flow F2 along the at least one or more second pathways 22 may include similar fluids for each one of the second pathways 22 or, in some cases, different fluids.

In accordance with further embodiments, the one or more components 20 may be disposed in the first pathway 11 such that a normal direction with respect to a plane of the heat transfer surfaces 21 may be transversely oriented with respect to a normal direction with respect to respective planes of the outer and inner peripheral walls 12 and 13. Also, the one or more components 20 may be formed as any one or more of a gearbox cowling 30, an ancillary component cover, a guide vane 40 and/or a structural feature of a turbomachine 50, as illustrated in FIG. 1. The first pathway 11 may be formed as a fan duct 60 of the turbomachine 50 with the first flow F1 including, for example, a relatively low temperature air flow and the second flow F2 including a relatively high temperature flow of oil.

Figure 2:
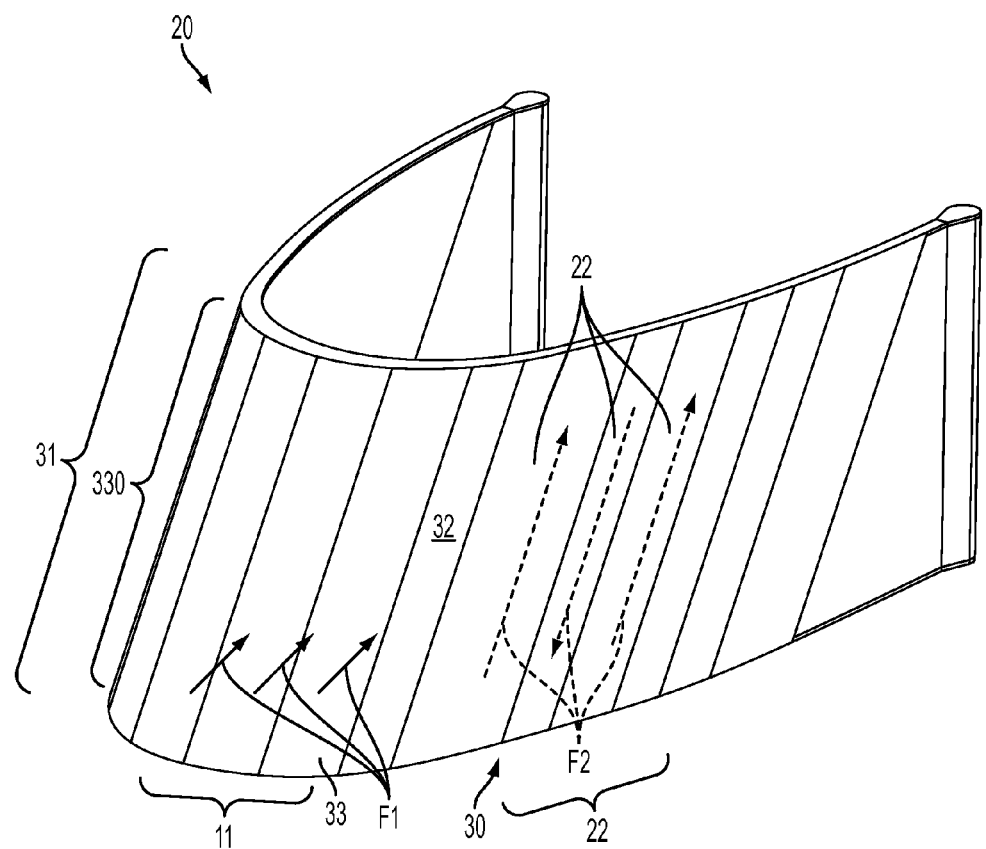
FIG. 2 is a perspective view of a heat exchanger apparatus formed as a gearbox cowling or an ancillary component cover of a turbomachine.

With reference to FIGS. 2-5, various embodiments are illustrated in which the one or more components 20 may be formed as a gearbox cowling 30. As shown in FIG. 2, the gearbox cowling 30 is disposed to extend across the first pathway 11 and includes a plurality of laminates 31. The laminates 31 are coupled together by one or more of brazing, diffusion bonding and/or welding processes to form heat transfer surfaces 32. The heat transfer surfaces 32 cooperatively define and form the at least one or more second pathways 22. The heat transfer surfaces 32 include a primary heat transfer surface 33, which is disposed to contact the first flow F1 and/or the second flow F2 whereby heat is transferred between the first and second flows F1, F2 via the primary heat transfer surface 32. In addition, the primary heat transfer surface 32 is oriented, as described above, such that a normal direction with respect to a plane of the primary heat transfer surface 32 is oriented transversely with respect to a normal direction with respect to respective planes of the outer and inner peripheral walls 12 and 13 (see FIG. 1).

As shown in FIG. 2, the primary heat transfer surface 33 is disposed to form a lead side of the gearbox cowling 30 relative to a predominant direction of the flow of the first flow F1. As such, in order to limit aerodynamic interaction with the flow of the first flow F1, the primary heat transfer surface 33 may be formed to have an airfoil shape or to have another shape which is similarly formed to present a low-drag condition.

Figure 3:
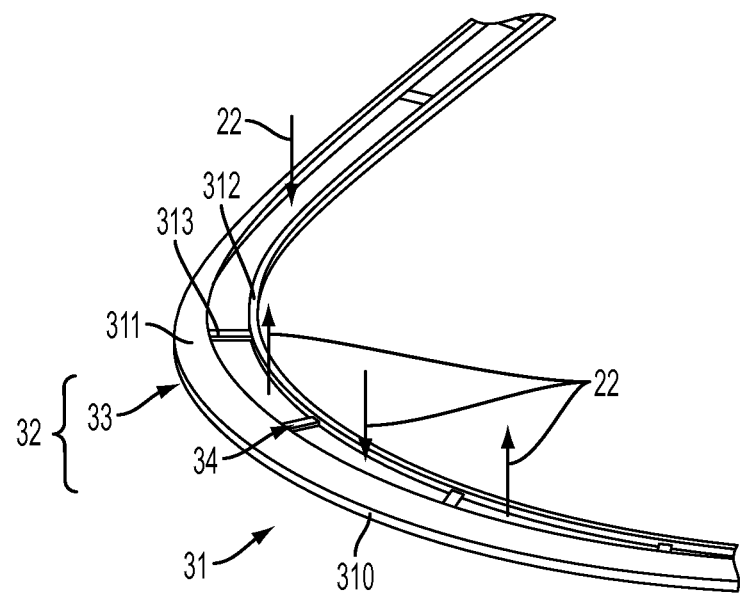
FIG. 3 is a perspective view of a laminate of the heat exchanger apparatus in accordance with an embodiment.

The heat transfer surfaces 32 include the primary heat transfer surface 33 (see FIG. 2) and further include secondary heat transfer surfaces 34 (see FIG. 3). The secondary heat transfer surfaces 34 are coupled to the primary heat transfer surface 33 and are configured to define a shape of the at least one or more second pathways 22 in cooperation with the primary heat transfer surface 33. In an exemplary embodiment, as shown in FIG. 2, the secondary heat transfer surfaces 34 may define the at least one or more second pathways 22 as having a serpentine shape (not shown) to promote thermal performance.

Figure 4:
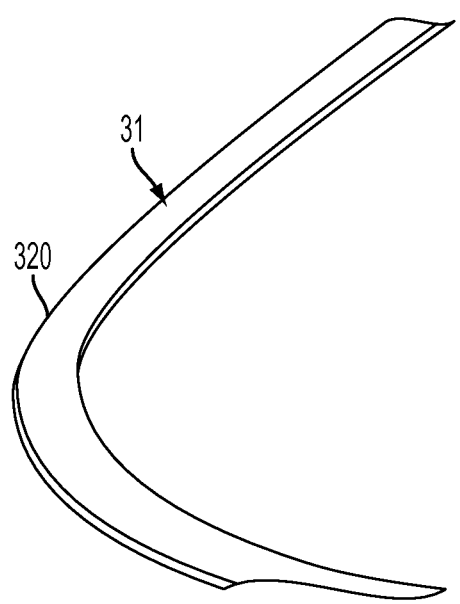
FIG. 4 is a perspective view of a laminate of the heat exchanger apparatus in accordance with an embodiment.

The laminates 31 include a plurality of flow laminates 310 (see FIG. 3) and separating plates 320 (see FIG. 4). The flow laminates 310 are formed such that the at least one or more second pathways 22 are defined to flow through the flow laminates 310 and are coupled together to form a main body 330 of the gearbox cowling 30 (see FIG. 2). The separating plates 320 are coupled to at least opposite end/side portions of the main body 330 of the gearbox cowling 30 and are configured to seal the second pathway 22 from surrounding structures.

In accordance with further embodiments, the separating plates 320 may be used internally within the main body 330 to seal the at least one or more second pathways 22 from one another by separating the respective flows and/or to direct flow paths in the above-described endplate configuration. For example, the gearbox cowling 30 may have 3 flows including 2 hot internal flows and 1 cold air flow with 2 separating plates 320 disposed on opposite end/side portions of the main body 330 and 1 separating plate 320 disposed internally within the main body 330.

Each one of at least a portion of the laminates 31, such as the flow laminates 310 in particular, may include a first portion 311, which is configured to form a segment of the primary heat transfer surface 32, a second portion 312, which is disposed in a trailing position with respect to the first portion 311 in the direction of flow of the first flow F1, and intermediate portions 313. The intermediate portions 313 are disposed to extend between the first portion 311 and the second portion 312, and are configured to form segments of secondary heat transfer surfaces 34.

Figure 5:
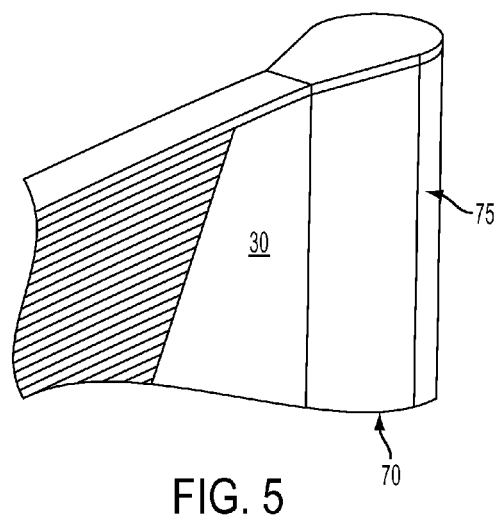
FIG. 5 is a perspective view of a tank and an end plate of a component of the heat exchanger apparatus in accordance with an embodiment.
Figure 6:
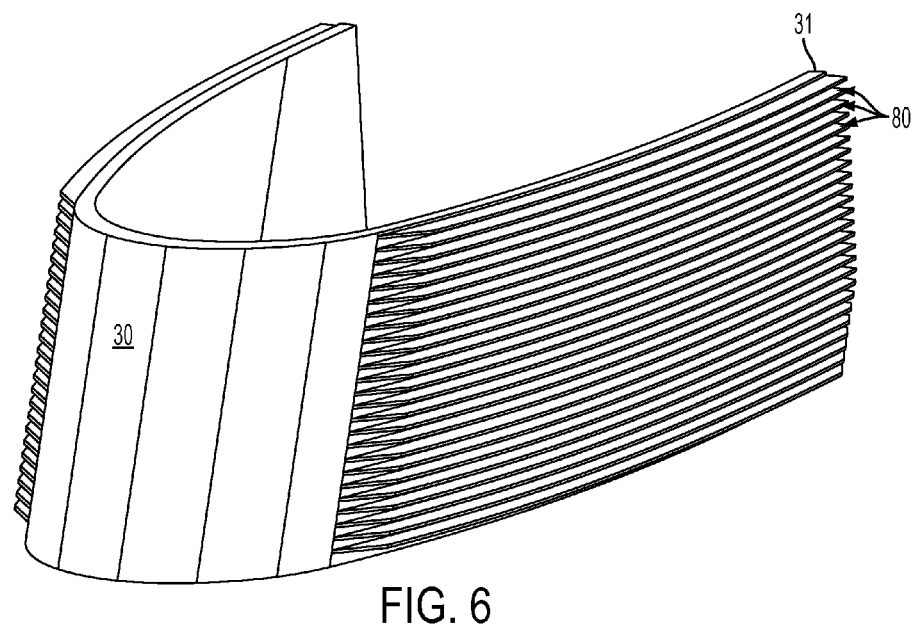
FIG. 6 is a perspective view of fins of the component of the heat exchanger apparatus in accordance with an embodiment.

With reference to FIGS. 5 and 6, the gearbox cowling 30 may further include oil tanks 70 disposed in an inlet/outlet arrangement and end plates 75. The oil tanks 70 and end plates 75 may be incorporated into the laminate structure of the gearbox cowling 30 as a whole or may be separate components. Where the oil tanks 70 and the end plates 75 are separate components, they may be formed using additional laminate structures or by conventional techniques. Also, as shown in FIG. 6, the laminates 31 may be further formed to include fins 80. The fins 80 extend from the primary heat transfer surface 32 and into the first pathway 11 such that the fins 80 aerodynamically and thermally interact with the flow of the first fluid F1. In addition, one or more of the laminates 31 may be provided with localized modifications, such as dummy layers, buffer layers and/or locally thickened features to aid in impact resistance to foreign objects.

Figure 7:
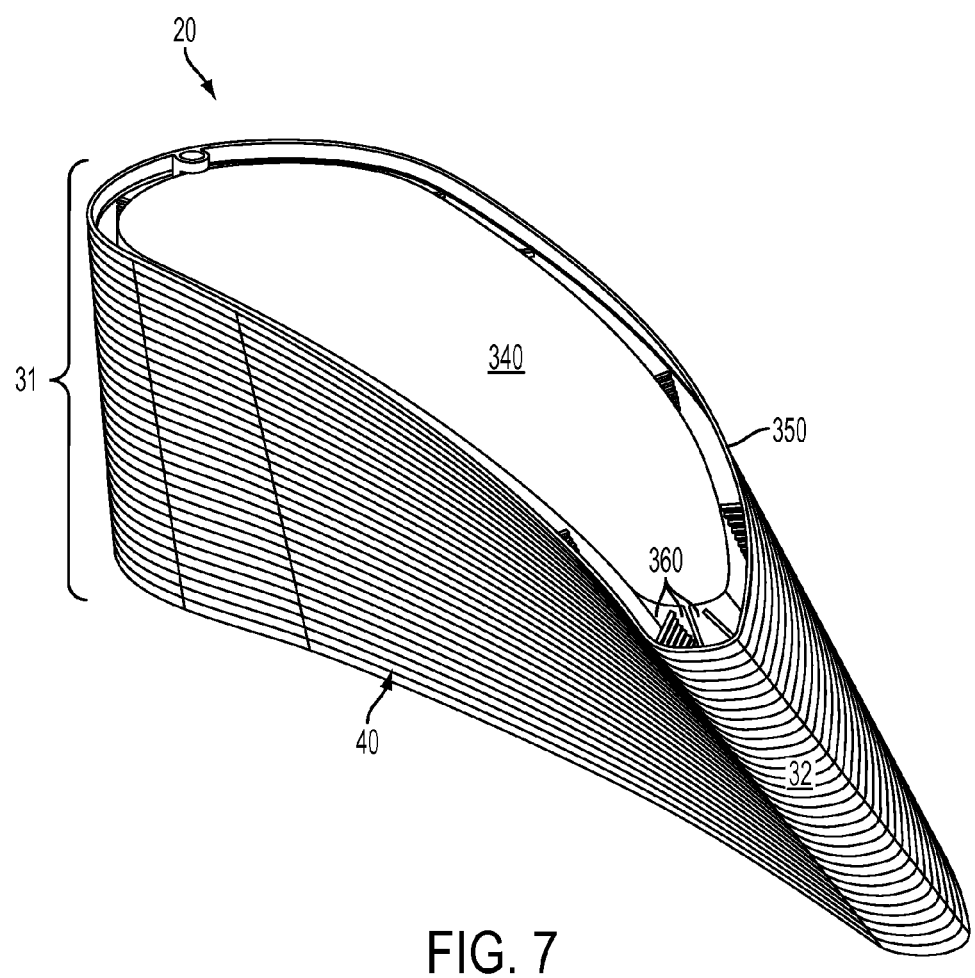
FIG. 7 is a perspective view of a heat exchanger apparatus formed as a guide vane of a turbomachine.
Figure 8:
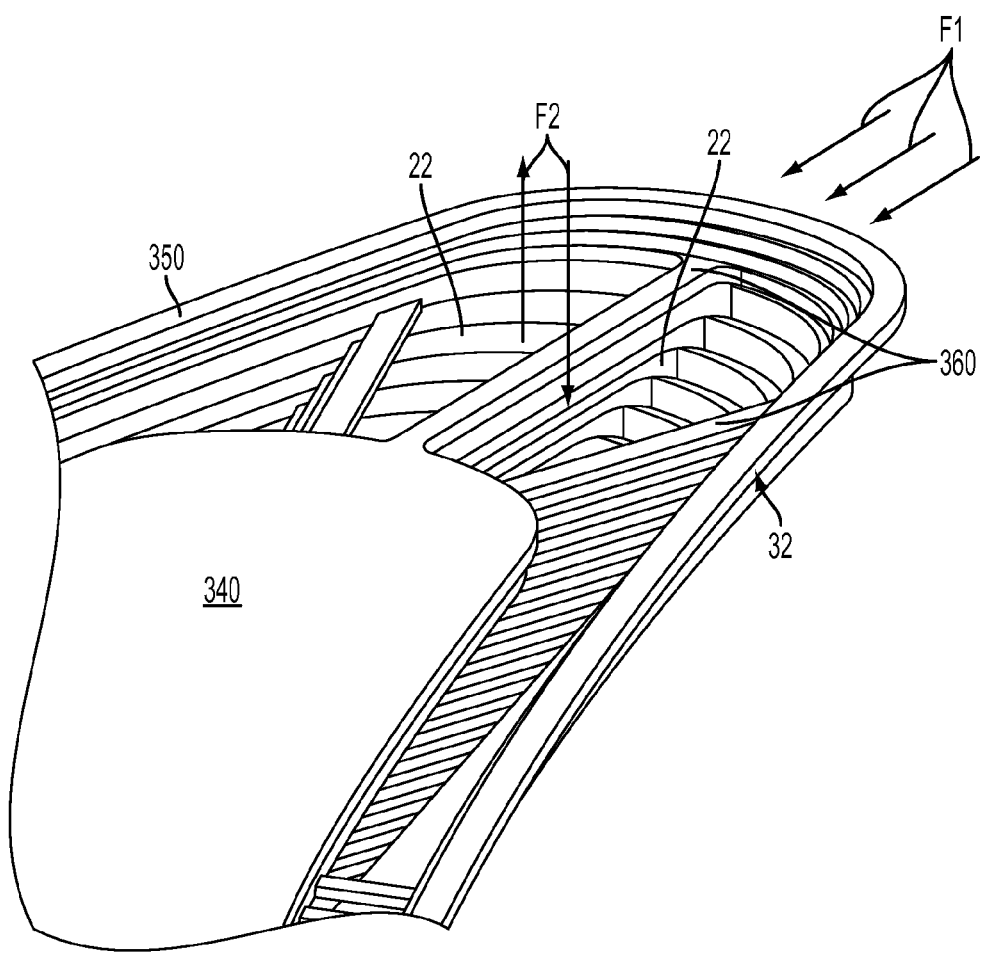
FIG. 8 is an enlarged perspective view of the heat exchanger apparatus formed as a guide vane of a turbomachine.

With reference to FIGS. 7 and 8, the embodiment in which the one or more components 20 may be formed as a guide vane 40 is illustrated. As shown in FIGS. 7 and 8, for the guide vane 40, each of at least a portion of the laminates 31 includes a central body 340, an outer body 350 surrounding the central body 340, which is configured to form a segment of the primary heat transfer surface 32 and intermediate bodies 360. The intermediate bodies 360 are disposed to extend between the central body 340 and the outer body 350 and are configured to form segments of secondary heat transfer surfaces 34 defining the at least one or more second pathways 22 in cooperation with the primary heat transfer surface 32.

In accordance with an embodiment of the invention, a shape of each of the outer bodies 350 may be substantially similar to that of each of the corresponding central bodies 340. In addition, as mentioned above, one or more of the laminates 31 may be provided with localized modifications, such as dummy layers, buffer layers and/or locally thickened features to aid in impact resistance to foreign objects. In any case, the guide vane 40 may have an airfoil shape that varies along a span thereof. This shape may be defined by the shape of each of the central bodies 340 and each of the outer bodies 350 when the laminates 31 are coupled together.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat exchanger apparatus configured to be disposed within a first pathway along which a first fluid flows, the heat exchanger apparatus comprising:
a component disposed in the first pathway, the component including heat transfer surfaces,
each heat transfer surface comprising:
a central body,
an outer body surrounding the central body and intermediate bodies extending between the central body and the outer body, the heat transfer surfaces being arranged together such that:

the central bodies, the outer bodies and the intermediate bodies of each heat transfer surface form at least one or more second pathways along which a second fluid flows, and the outer body of each heat transfer surface forms a component surface disposed to contact the first and second fluids.

2. The heat exchanger apparatus according to claim 1, wherein a plane of each of the heat transfer surfaces is transverse with respect to respective planes of peripheral walls defining the first pathway.

3. The heat exchanger apparatus according to claim 1, wherein the component comprises one of a gearbox cowling, a guide vane, and a structural element of a turbomachine, wherein the first pathway comprises a fan duct, and wherein the first fluid comprises an air flow and the second fluid comprises oil.

4. An assembly having a heat exchanger apparatus, the assembly comprising:

outer and inner walls forming a first pathway along which a first fluid flows; and a component disposed in the first pathway, the component including laminates coupled together to form heat transfer surfaces, wherein each laminate comprises:

a first portion;

a second portion; and spaced-apart intermediate portions extending between the first and second portions such that the first, second and intermediate portions form at least one or more second pathways along which a second fluid flows, the first portion of each laminate being disposed to contact the first and second fluids and oriented transversely with respect to respective planes of the outer and inner walls.

5. The assembly according to claim 4, wherein the component comprises one of a gearbox cowling, a guide vane, and a structural element of a turbomachine, wherein the first pathway comprises a fan duct, and wherein the first fluid comprises an air flow and the second fluid comprises oil.

6. The assembly according to claim 4, wherein the first portion has an airfoil shape.

7. The assembly according to claim 4, wherein the laminates are brazed, diffusion bonded and/or welded together.

8. The assembly according to claim 4, further comprising separating plates to seal the at least one or more second pathways.

9. An assembly having a heat exchanger apparatus, the assembly comprising:

outer and inner walls forming a first pathway along which a first fluid flows; and a component disposed in the first pathway, the component including laminates coupled together to form heat transfer surfaces, wherein each of the laminates comprises:

a central body;

an outer body surrounding the central body; and intermediate bodies extending between the central body and the outer body such that the central body, the outer body and the intermediate bodies form at least one or more second pathways along which a second fluid flows, the outer body of each laminate being disposed to contact the first and second fluids and oriented transversely with respect to respective planes of the outer and inner walls.

10. An assembly having a heat exchanger apparatus, the assembly comprising:

outer and inner walls configured to define a first pathway along which a first fluid flows; and a component disposed to extend across the first pathway, the component including a plurality of laminates coupled together, wherein each of the plurality of laminates comprises:

a first portion;

a second portion; and spaced-apart intermediate portions extending between the first portion and the second portion such that the first portion, the second portion and the intermediate portions form at least one or more second pathways along which a second fluid flows, the first portion of each laminate being disposed to contact the first and second fluids and being oriented transversely with respect to respective planes of the outer and inner walls.

11. The assembly according to claim 10, wherein the component comprises one of a gearbox cowling, a guide vane, and a structural element of a turbomachine, wherein the first pathway comprises a fan duct, and wherein the first fluid comprises an air flow and the second fluid comprises oil.

12. The assembly according to claim 10, wherein the first portion has an airfoil shape.

13. The assembly according to claim 10, wherein the laminates are brazed, diffusion bonded and/or welded together.

14. The assembly according to claim 10, further comprising separating plates to seal the at least one or more second pathways.

15. An assembly having a heat exchanger apparatus, the assembly comprising:

outer and inner walls configured to define a first pathway along which a first fluid flows; and a component disposed to extend across the first pathway, the component including a plurality of laminates each comprising:

a central body;

an outer body surrounding the central body; and intermediate bodies extending between the central body and the outer body, the central body, the outer body and the intermediate bodies forming at least one or more second pathways along which a second fluid flows, the outer body of each laminate being disposed to contact the first and second fluids and being oriented transversely with respect to respective planes of the outer and inner walls.

* * * * *